March 23, 1971  D. E. ROACH  3,572,363
FLUID FLOW CONTROL DEVICE
Filed April 25, 1969  2 Sheets-Sheet 2
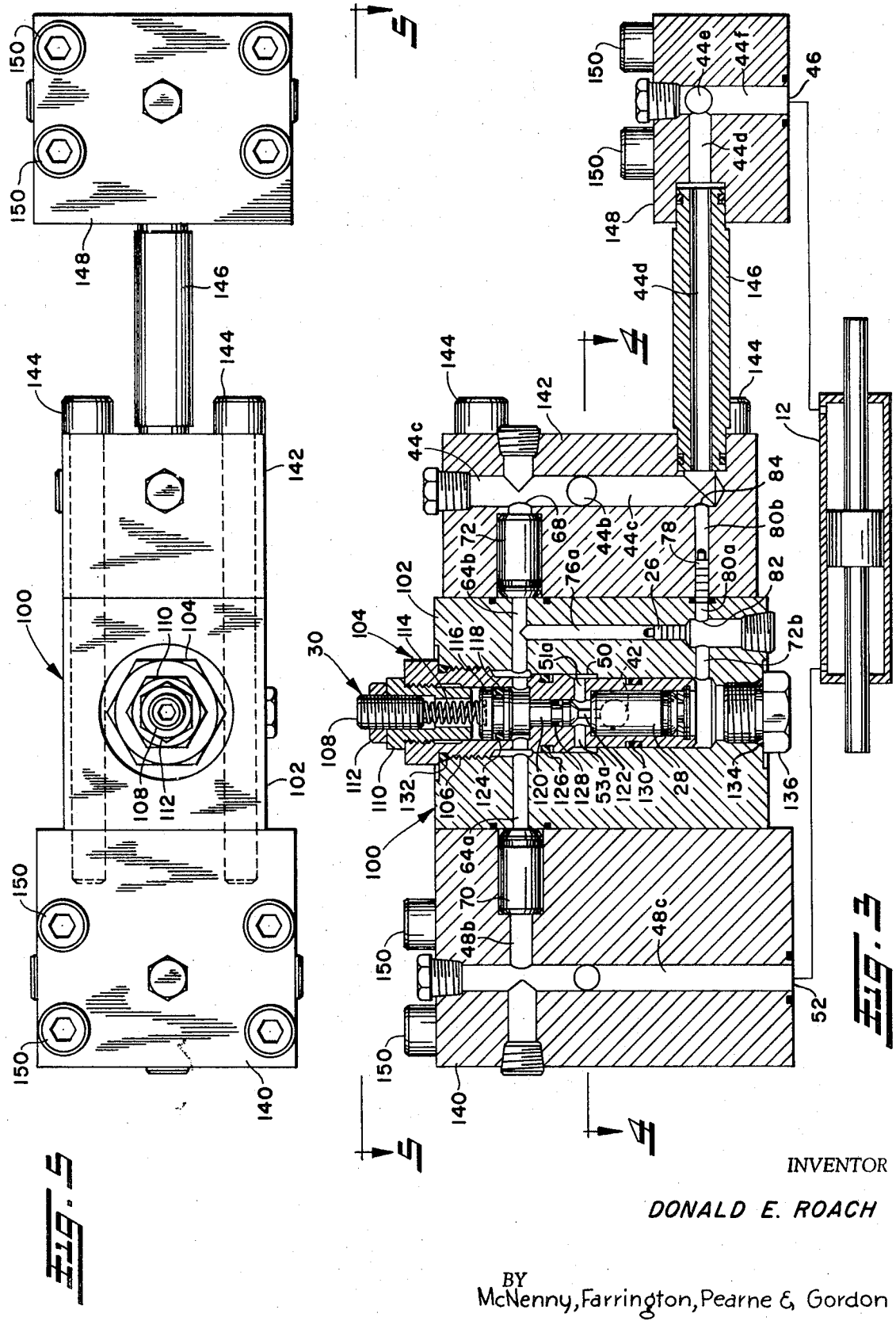
INVENTOR
DONALD E. ROACH
BY
McNenny, Farrington, Pearne & Gordon
ATTORNEYS United States Patent Office 3,572,363
Patented Mar. 23, 1971

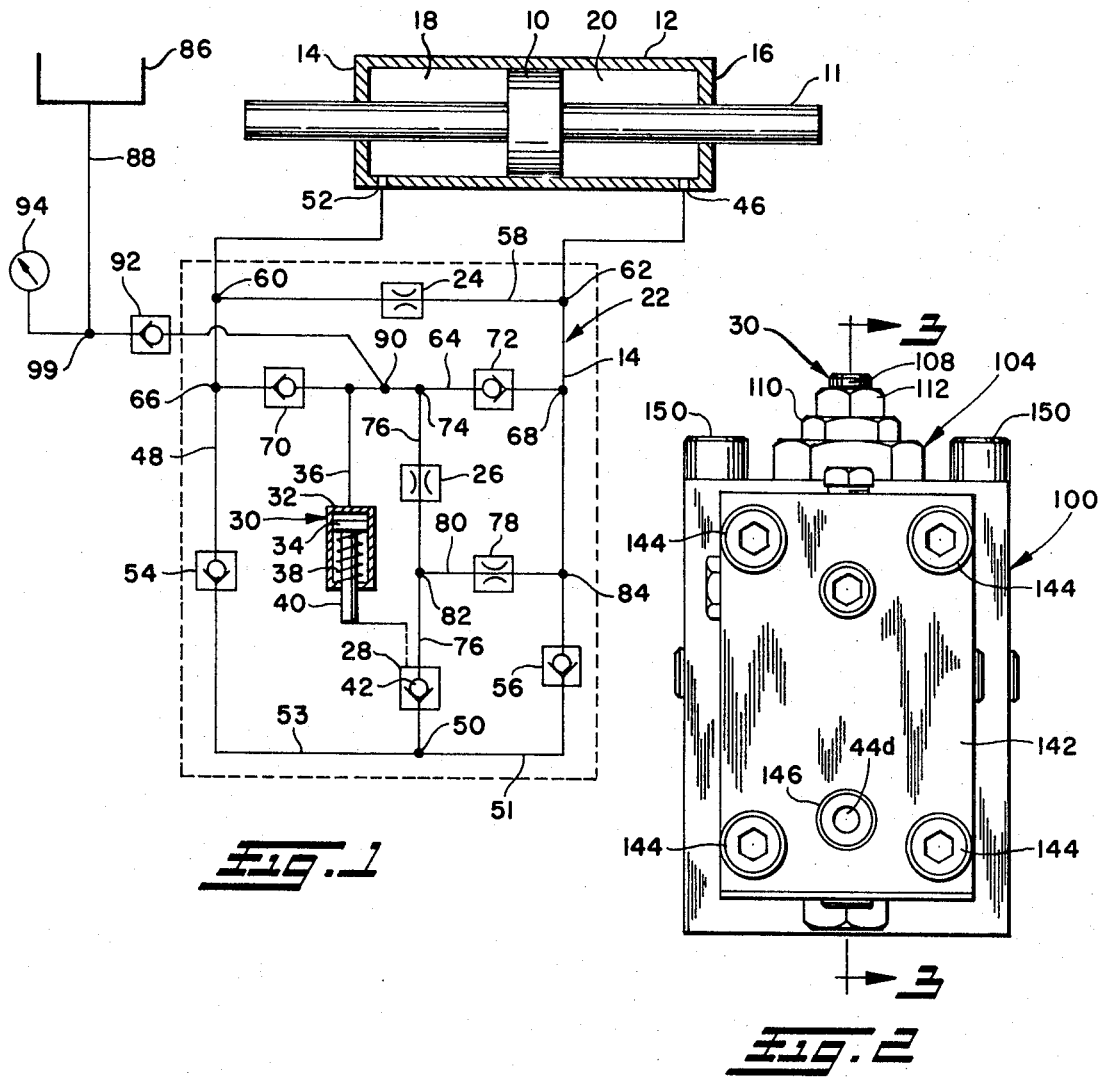
Fig. 1
Fig. 2
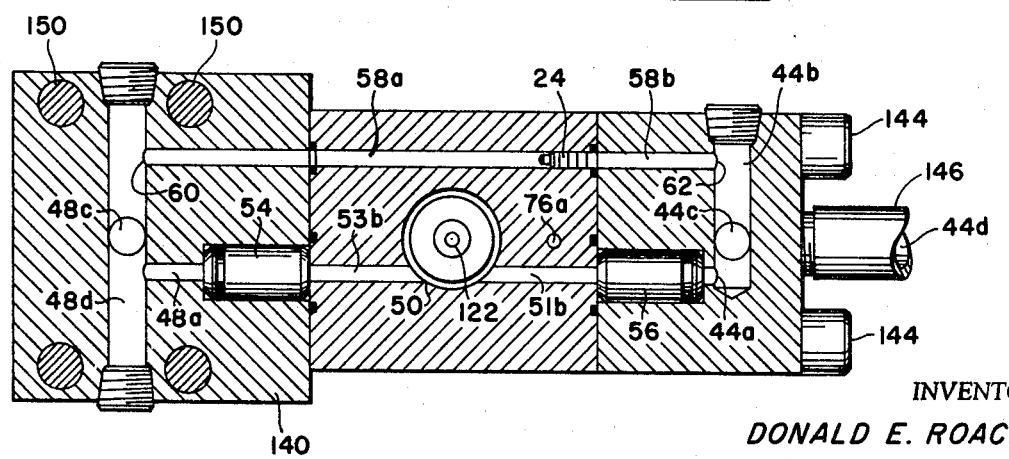
Fig. 4
INVENTOR
DONALD E. ROACH

3,572,363
FLUID FLOW CONTROL DEVICE
Donald E. Roach, Port Huron, Mich., assignor to McDowell-Wellman Engineering Company, Cleveland, Ohio
Filed Apr. 25, 1969, Ser. No. 819,183
Int. Cl. F16d 57/00
U.S. Cl. 137—109
18 Claims

ABSTRACT OF THE DISCLOSURE

There is provided a fluid flow control device which is particularly useful in hydraulic shock absorber or damping devices and characterized by a circuit attachable to a system where fluid moves under pressure in either of two directions. This circuit includes a pair of constrictions of considerably different resistance to fluid flow in parallel with each other. By-pass means are provided in conjunction with one constriction which functions to render the other constriction inoperative when predetermined pressure conditions exist.

BACKGROUND OF INVENTION AND PRIOR ART

This invention relates to a fluid control system which is particularly useful in combination with hydraulic shock absorbing or damping devices on braces for equipment, e.g. a sway brace, which equipment is otherwise supported but subject to movement. In equipment installations such as fluid handling systems including pipelines or liquid vessels, it is often necessary to protect the equipment from sudden shock loads which might otherwise cause damage to the equipment. At the same time such control apparatus should be capable of permitting relatively slow movement of the equipment over a predetermined range of movement due to thermal expansion or contraction in response to normal temperature changes in or around the system. Even relatively mild shocks should be permitted to be transmitted to or from the equipment so long as they are below a predetermined level. The bracing apparatus in such an embodiment should be designed, however, to protect the equipment against relatively violent shocks. These devices support no load, offer small resistance to normal movement, but provide efficient damping under abnormal force conditions which could otherwise cause large movement and resulting damage to equipment.

Numerous devices have been suggested for such purposes, notably that shown in U.S. Pat. 3,106,992. The present invention represents an improvement upon the device there shown both as to structure and as to mode of operation. Other structures related thereto include Mitereff 2,375,377 and Funkhouser 2,869,685.

The present invention provides a simplified and efficient structure characterized by freedom from opposing spring control means for adjusting the pressure at which by-pass means are rendered inoperative such that damping may occur at high shock or impact loads and little or no damping is experienced under normal loads. These devices are operative independently of the direction of fluid flow in the main circuit as will become clear upon reference to the annexed drawings.

BRIEF STATEMENT OF INVENTION

Briefly stated, the present invention is in a fluid flow control device for a damper. More particularly, the invention relates to means included in a circuit comprising a first constriction or orifice and a normally open fluid gate connected in series therewith, said constriction and gate being in a line bridging opposite sides of said circuit. Pressure-responsive means are also provided which coact between the circuit and the gate for actuating the gate at a predetermined pressure to a closed position. When this control means is connected in a circuit, and said circuit also includes a second constriction, preferably of substantially higher resistance to fluid flow than said first mentioned constriction or orifice which is in parallel with said control means, a highly effective and efficient damping device is provided. These control devices are particularly adapted for use in a circuit coacting in a hydraulic damping device by being connected to isolated sources of fluid, e.g. liquid, under pressure to regulate fluid flow in either of two directions therebetween. In more specific embodiments of the invention, the circuit is also provided with flow control means coacting in the circuit to provide unidirectional flow of fluid through the orifice of lower resistance to fluid flow and the pressure-actuated fluid gate means independently of the direction of flow in the aforesaid hydraulic damping devices. Such hydraulic damping devices are particularly adapted for use with sway braces or shock absorbers for bracing members used in stabilizing apparatus such as piping or vessels relative to a rigid support. The mode of installation of these devices as sway braces is well understood by those skilled in the art and further elaboration is deemed unnecessary.

BRIEF DESCRIPTION OF DRAWINGS

In the annexed drawings:

FIG. 1 is a diagrammatic representation of the hydraulic control circuit of the present invention coacting in a damping circuit, the latter being shown in an embodiment represented in FIGS. 2–5 inclusive.

FIG. 2 is an end view of a structure embodying the present invention omitting, however, the details of a high pressure fitting.

FIG. 3 is a cross-sectional view of the device shown in FIG. 2 as it appears in the plane indicated by the numerals 3—3.

FIG. 4 is a transverse cross-sectional view of the device as shown in FIG. 3 as it appears in the plane indicated by the numerals 4—4.

FIG. 5 is a top plan view of the device shown in FIG. 2 including, however, the high pressure fitting omitted from FIG. 2.

DETAILED DESCRIPTION OF DRAWINGS

The physical embodiment shown in FIGS. 2–5 is a preferred embodiment of the invention shown in diagrammatic form in FIG. 1, and description of FIG. 1 preliminary to description of the specific embodiment will render the subject matter clearer.

Accordingly, FIG. 1 shows in diagrammatic form a suppressor cylinder and piston which is conveniently a component of a sway brace otherwise of a conventional design, for example as shown in U.S. Pat. No. 3,106,992. The cylinder is adapted for attachment to either the support, or the equipment being supported, and the piston which is relatively movable with respect to the cylinder is adapted for attachment, respectively, to either the equipment being supported, or the support. A piston 10 is provided which is relatively movable in a cylinder 12 and defines in respect of cylinder heads 14 and 16, isolated fluid chambers 18 and 20, respectively. The piston 10 is connected to a piston rod 11 which extends through both the cylinder heads 14 and 16 so that the total volume of both the chambers 18 and 20 is substantially constant regardless of the position of the piston 10. When the piston 10 is caused to move relative to the cylinder 12 under either shock loading conditions or nonviolent loading conditions, the fluid in the respective chambers 18 and 20 is submitted to a pressure differential which causes fluid to flow in the external circuit generally indicated at 22. It is in the controls in and the structure of the external circuit 22 that the present invention lies.

The external circuit 22 is characterized by a pair of constrictions or the orifices 24 and 26 which are in parallel with each other. These constrictions are of different resistance to fluid flow, the higher resistance being 24 and the lower resistance being the orifice 26. For example, the orifice 24 may have a fluid rating of 9,000 Lohms, and the orifice 26 a fluid rating of 500 Lohms. (The term "Lohm" is a measurement of resistance to fluid flow useful in connection with orifices having a very high amount of restriction of such a nature that they tend to act as a fixed resistance regardless of the pressure drop or rate of flow. The term "Lohm" is defined so that a resistance of one Lohm will allow the flow of 100 gallons of water per minute with a pressure drop of 25 p.s.i. at a temperature of 80° F. Thus, an orifice having a rating of 500 Lohms will permit the flow of 0.2 gallon per minute of water at a pressure drop of 25 p.s.i. at a temperature of 80° F., and at a pressure drop of 1,000 p.s.i. it will allow a flow of 8 gallons per minute.) Generally, the difference in fluid flow resistance between the orifices 24 and 26 should be a factor of an order of from 2 to 100 times the lower flow resistance (larger orifice). The size of the larger orifice 26 is determined to be that which at the minimum fluid flow rate to be protected against by the damping apparatus produces a pressure drop across the orifice 26 sufficient to actuate a pressure-responsive device 30.

The control apparatus within circuit 22 includes the larger orifice 26, the pressure-responsive device 30 and a fluid gate 28 which is in series with the larger orifice 26. The combination of the larger orifice 26 and the fluid gate 28 constitutes a by-pass means across the circuit 22 when the gate 28 is open. The gate 28 is maintained in a normally open position by the pressure-responsive device 30. In the device diagrammatically shown in FIG. 1, and more specifically embodied in the apparatus shown in FIGS. 2–5, there is provided a cylinder 32 including a piston 34 movable therein. Fluid under pressure is introduced into the space between the head of cylinder 32 and piston 34 through a conduit 36. On the opposite side of the piston 34 there is provided a biasing spring 38 which coacts between the opposite head of the cylinder 32 and the reverse side of piston 34 to resist movement of the piston 34 in a single direction within the cylinder 32. There is also provided a piston rod 40 extending externally of the cylinder 32 which coacts with the gate 28. As will be shown hereinafter, the gate 28 is desirably in the form of a ball-type check valve, and the piston rod 40 is so adapted and disposed as to maintain the ball 42 in an unseated position, thereby maintaining the gate 28 normally open. However, when the pressure in the conduit line 36 exceeds a predetermined value, the biasing force of spring 38 is overcome and the piston 34 is allowed to move in the cylinder 32 in such a way as to permit the ball 42 to reseat itself and close the gate 28. In such circumstances, flow through the orifice 26 is terminated and the fluid must then move in circuit 22 across the orifice 24. The orifice 24 being of much higher resistance to fluid flow utilizes a great deal more energy and thus acts to dampen movement of the piston 10 in the cylinder 12.

However, when the pressure in the fluid conduit 36 is insufficient to overcome the biasing force of the spring 38, the gate 28 remains open and since the resistance to fluid flow in this circuit is less than the resistance to flow through the orifice 24, fluid moves relatively freely in the circuit and very much smaller damping effect on movement of the piston 10 in the cylinder 12 is experienced. In this condition, then, normal vibrations, thermal forces and the like are accommodated at a relatively slow rate of flow of fluid occasioned by the relatively slow movement of the piston 10 relative to the cylinder 12. As will be described with respect to the specific embodiment, the biasing spring 38 is conveniently associated with manual spring compression adjusting means so that the pressure at which the force on the spring 38 is overcome may be set by hand to a predetermined value. Such a predetermined value is in specific embodiments approximately 10 lbs./sq. in. below which point the gate 28 is maintained in the open position. However, should the pressure in the system exceed such a predetermined level, the pressure-actuated means 30 is operated and the gate 28 is closed.

The balance of the circuit is composed of fluid lines and gates which are operative to maintain the direction of flow of fluid through the orifice 26 and the gate 28 in one direction only. Thus, the circuit 22 includes a fluid conduit portion 44 having one extremity 46 in fluid communication with the chamber 20 of the cylinder 12. The other extremity of the fluid conduit portion 44 is joined to an opposite member fluid conduit portion 48 as for example at juncture 50. The free extremity 52 of the conduit portion 48 is attached to the cylinder 12 for fluid communication with the fluid contained in the chamber 18. The fluid conduit portion 48 contains a unidirectional fluid gate 54 which is disposed so as to resist flow in the circuit 22 toward the juncture 50. In like manner, the fluid conduit portion 44 contains a unidirectional fluid gate 56 also disposed to resist flow toward the juncture 50. Intermediate the extremities 52 and 46, and the respective fluid gates 54 and 56, a bridging conduit 58 is provided joining the fluid conduit portions 48 and 44 with each other, which bridging conduit 58 includes an orifice 24 as previously described. The bridging conduit 58 joins the fluid conduit portions 48 and 44 at the junctures 60 and 62, respectively.

In parallel with and at a point downstream with respect to the junctures 60 and 62, respectively, a second bridging circuit is provided including the above-described pressure-responsive fluid flow control means. This bridging circuit includes a cross conduit 64 joining with the fluid conduit portion 48 at a juncture 66 and the fluid conduit portion 44 at a juncture 68. The conduit 64 is provided with a pair of unidirectional fluid gates 70 and 72 disposed in back-to-back relation, but each permitting fluid flow under pressure in a direction toward a point between the gates 70 and 72.

Intermediate the gates 70 and 72, the conduit 64 communicates at a juncture 74 with a conduit 76 which contains relatively larger orifice 26 and the fluid gate 28. It should be noted that although the fluid gate 28 is shown as a unidirectional fluid gate, e.g. a check valve, the fluid gate 28 is not necessarily unidirectional. The conduit 76 then enters the circuit 22 at the juncture 50.

It will be seen, therefore, that regardless of direction of movement of the piston 10 in the cylinder 12, the arrangement of the gates 54, 70, 72 and 56 is such that the flow of fluid through the conduit 76 will always be in the same direction (assuming orifice 24 to be relatively inoperative, or the path of greater resistance).

In order to avoid hydraulic lock-up of the system, an extremely high resistance to fluid flow is provided in the form of an orifice 78 which by-passes gates 28 and 56 and is in a conduit 80 which joins the conduit 76 at a juncture 82 and the fluid conduit source 44 at a juncture 84. In a specific embodiment, the orifice 78 may have a fluid rating of 60,000 Lohms. This provides means for bleeding off fluid under high pressure which has caused the pressure-responsive means 30 to operate, closing the gate 28. In the absence of such an escape, highly pressurized fluid may be trapped within the circuit between the gates 70, 72 and 28.

In order to supply fluid to the system, there is provided a reservoir 86 communicating through a conduit 88 into cross conduit 64 at a juncture 90. In order to maintain pressure on the system, a unidirectional fluid gate 92, such as a check valve, is provided in the conduit 88. A pressure gauge 94 is also conveniently included in the circuit being attached at juncture 96.

DESCRIPTION OF OPERATION

In the apparatus shown diagrammatically in FIG. 1, the cylinder 12 may be secured to a stationary support (not shown), and the piston 10 through its projecting rod portion 11 may be secured to a device to be braced (not shown). Let us assume first the imposition of forces causing the fluid in the chamber 18 to be pressurized. This pressurization occurs under either of two conditions; namely (a) imposition of ordinary forces, e.g. thermal or simple ground vibrations, and (b) imposition of shock loading forces, e.g. an explosion. Movement of the piston 10 toward the cylinder head 14 will cause fluid to flow through the fitting 52 into the fluid conduit 48 at a rate which is dependent upon the nature of the force imposing condition. The fluid gate 54 operating in response to elevated pressure in the fluid conduit 48 remains closed. Fluid therefore flows into the bridging conduit 64 through the fluid gate 70 which allows fluid under pressure to pass inwardly toward the center of the conduit 64. Fluid may also flow through the bridging conduit 58 through the orifice 24.

The unidirectional fluid gate 54 in response to both the increased pressure in the conduit portion 48 and the reduced pressure on the fluid in the conduit portion 44 with which it is connected remains closed. Accordingly, fluid under pressure is now forced either through bridging conduit 58 or through the bridging circuit 64. Now, the two subconditions postulated in the assumptions above are considered:

The pressure-responsive means 30 is as has been above described an adjustable device which permits manual setting of the pressure at which this element becomes operative, e.g. 9–10 p.s.i. At fluid flow rates in the circuit productive of a pressure drop across the orifice 26 below this level, the pressure-responsive device 30 maintains the gate 28 in the open fluid by-pass condition. Thus, under the first condition, i.e. normal loads, wherein the fine pressure never exceeds the predetermined set limit, e.g. 9–10 p.s.i., the gate 28 remains open and the fluid will then flow from the juncture 66 through the conduit 64 and the large orifice 26 through gate 28 maintained in the normally open position to the juncture 50, through the gate 56 which allows flow back toward the connection point 46 and into the chamber 20. Because this path offers less resistance to fluid flow than conduit 58 including orifice 24, the bulk of the fluid will follow this path.

Assuming the second condition with respect to the chamber 18, i.e. a shock loading condition, the fluid pressure in the chamber 18 greatly exceeds the 9–10 p.s.i. limit and may approach 5,000 p.s.i. Again, the fluid gates 54 and 70 operate in the same manner and fluid flows due to the movement of the piston 10 in the cylinder 12 now at a much higher pressure and correspondingly much higher rate. In this circumstance, the pressure-responsive means 30 is actuated, and the fluid gate 28 is closed whereby fluid is now effiectively blocked from passage through this parallel circuit, the only escape means being the orifice 78 which, as indicated above, is extremely small relative to the orifice 24. Thus, the larger portion of the fluid flowing in the system must now utilize bridging conduit 58 including the orifice 24 and then back through the connection point 46 into the chamber 20. The gates 54 and 56 will remain closed due to the elevated pressure in the lines 48 and 44, respectively. Because the orifice 24 is relatively smaller than the orifice 26 and the gate 28, considerable energy is expended in forcing fluid through such orifice and thus a damping effect is obtained under these shock conditions.

As will be observed from the diagram of FIG. 1, when the chamber 20 is pressurized under either of the two conditions, i.e. normal loads or shock loads, the general operation of the system is virtually identical with the exception that the fluid always flows through the conduit 76 in the same direction because of the disposition of the fluid gates in the external circuit. In the same manner, the pressure-responsive device 30 is actuated or not actuated, as the case may be, to either close the normally open fluid gate 28, or to allow it to remain open and thus by-pass the smaller orifice 24. Fluid flowing through orifice 24 may flow in either direction.

Loss of fluid in the system is made up from a reservoir 86 communicating to the system through the fluid gate 92 which is also unidirectional, introduction into the system being conveniently at a juncture 90 in the conduit 64, although any convenient point of introduction into the system may be employed.

The effect of the device is to exert little damping effect of fluid flowing in a relatively open circuit when the loads upon the system are within a minimum range sufficient to accommodate normally experienced loads, e.g. thermal loads, ground vibrations, etc. However, when these loads are exceeded as by explosion or fluid hammer effects in the apparatus being supported, damping at these forces is effected by causing fluid to move at a high rate and through a small orifice under very high pressure, thereby absorbing through such fluid movement the effects of the shock loading upon the system.

It becomes convenient at this point to describe a physical embodiment of the system above described, it being understood that this embodiment is but a preferred mode of incorporating the subject matter of the present invention.

DESCRIPTION OF PREFERRED EMBODIMENT

Referring now more particularly to FIGS. 2–5 inclusive, there is here shown a housing generally indicated at 100. Conveniently, the housing 100 is composed of separate blocks for aid in assembly and location of the operative components. In referring to FIGS. 2–5 inclusive, numbers corresponding to those used in FIG. 1 will be used to indicate specific embodiments of devices represented in FIG. 1. Small arabic letters after a number indicate a portion of the correspondingly numbered conduit or line in FIG. 1.

Accordingly, there is provided a central housing block 102 containing a cylinder assembly generally indicated at 104. In the central block 102 there is provided a cross bore 64a–64b which communicates with a transverse bore 76a–76b containing therein a relatively large orifice 26 which functions as a low pressure by-pass fitting. The cross bore 76b communicates with a check valve 28 containing a ball 42. Fluid flowing through the cross bore 76b and into the check valve 28 exits through transverse ports 51a or 53a depending upon the origin of fluid flow and communicates with lines 51b or 53b (FIG. 4), respectively.

The housing block 102 contains a centrally disposed stepped transverse bore 106 into which is inserted the cylinder assembly 104 including check valve 28 and a spring-biased hydraulic pressure-actuated device generally indicated at 30 for maintaining check valve 28 in the normally open position. The pressure-actuated means 30 includes a low pressure adjusting screw 108 threadably secured in a bushing 110 and conveniently provided with a lock nut 112 or carried in turn in the cylinder assembly 104 which is threaded for retention in the bore 106. The bushing 110 contains a spring 114 which coacts between the single adjusting screw 108 and a hydraulic piston 116. The hydraulic piston 116 moves a limited distance in cylinder 118 which is in fluid communication wth the cross bore 64a–64b and provides a single pressure-activatable surface operable irrespective of the direction of the movement of the piston 10 in cylinder 12 in contradistinction to prior art devices. Thus, the piston 116 moves in opposition to the biasing spring 114 when the pressure in the cross port 64a–64b exceeds the biasing force of the spring 114. The piston 116 is provided with a pin support 120 and a pin 122 coacting between the support 120 and the ball 42 in the check valve 28 whereby the ball 42 is normally unseated and the check valve 28 is therefore normally open. When the pressure in the cross port 64a–64b exceeds the predetermined limit set by the low pressure adjusting screw 108, the piston 116 moves in the cylinder 118 toward the adjusting screw 108 so displacing the pin 122 as to permit the ball 42 to seat and thus close the valve 28. When the valve 28 is closed, fluid which would normally flow through the cross port 76b through cross port 51a or 51b and back to the chamber 18 or 20 is effectively blocked, and fluid is therefore forced through the high pressure orifice 24 (FIG. 4). Suitable sealing means such as O-rings 124, 126, 128, 130, 132 and 134 are provided to effect suitable sealing within the transverse bore 106. A suitable closure plug 136 is provided for the opposite end of bore 106.

The housing block 140 which is suitably bored and plugged in a known manner is provided for retaining the check valves 70 and 54, and to communicate with the fluid conduit 48c which is in turn secured through the fitting 52 to the cylinder 12. In like manner, the housing block 142 is also suitably bored and plugged and provided to retain the check valves 56 and 72 in suitable communication with the fluid conduit 44a–f which communicates through the fitting 46 with the cylinder 12. The blocks 102, 140 and 142 are conveniently bolted together as by bolts 144. In the embodiment shown, a feed line 146 containing conduit portion 44d extends between housing block 142 and an auxiliary housing block 148. The feed line 146 is a predetermined length to dispose the housing block 148 suitably relative to the suppressor cylinder 12. The housing block 148 contains conduit portion 44d and is connected to the cylinder 12 through fitting 46. The mode of securing the housing block 148 to the cylinder 12 may be any convenient mode, although as shown in FIGS. 2, 3 and 5, bolts 150 are utilized for this purpose.

The mode of operation of the apparatus described in FIGS. 2–5 is that which has been described above in reference to FIG. 1.

What is claimed is:

1. A damping device including fluid flow control means for attachment to isolated sources of fluid under pressure to regulate fluid flow in either of two directions therebetween comprising in combination:
    (a) a circuit including a pair of constrictions of different resistance to fluid flow in parallel with each other,
    (b) fluid pressure actuated by-pass means in parallel with one of said constrictions operable at a predetermined fluid pressure to control flow through said one constriction; and
    (c) fluid flow control means coacting in said circuit to provide unidirectional fluid flow through one of said constrictions independently of the direction of fluid movement in said isolated sources of fluid under pressure.

2. A device in accordance with claim 1 wherein the by-pass means comprises a unidirectional fluid gate.

3. A device in accordance with claim 1 wherein the by-pass means is in series with the constriction of lower resistance to fluid flow.

4. A device in accordance with claim 1 wherein the by-pass means is in parallel with the constriction of higher resistance to fluid flow.

5. A device in accordance with claim 1 wherein the by-pass means includes means for adjusting the fluid pressure at which said by-pass means is actuated.

6. A device in accordance with claim 1 in which the by-pass means is normally open.

7. A device in accordance with claim 1 in which the by-pass means includes a check valve.

8. A device in accordance with claim 1 in which the by-pass means comprises a fluid gate and a fluid pressure-responsive actuator coacting with said gate to maintain said gate open below a predetermined fluid pressure and to close said gate above said predetermined pressure.

9. A device in accordance with claim 8 wherein the fluid pressure-responsive actuator is a piston movable in a cylinder and the cylinder is in parallel fluid communication with the circuit including the pair of constrictions of different resistance at a point upstream of said constrictions.

10. A damping device including fluid flow control means, said means comprising in combination:
    (a) a pair of first fluid conduits in fluid communication with each other at adjacent extremities, said conduits having free extremities adapted for attachment to isolated sources of fluid under pressure, respectively;
    (b) a unidirectional fluid gate in each of said first conduits intermediate its extremities, said gate opposing fluid flow toward said adjacent extremities, respectively;
    (c) second fluid conduit means in said circuit in fluid shunting relation to said isolated sources and including a first constriction;
    (d) third fluid conduit means extending between and communicating with each of said first fluid conduits at a point between said fluid gate and the free extremity thereof;
    (e) said third fluid conduit means including a pair of unidirectional flow gates in spaced relation, the direction of fluid flow through said gates being opposite and inwardly from each of said first fluid conduits;
    (f) bridging fluid conduit means communicating from a point intermediate said pair of oppositely directed fluid gates in said third fluid conduit means to at least one of said first fluid conduits and between the unidirectional fluid gate in said first fluid conduit and the adjacent extremity thereof;
    (g) said bridging conduit means including a second constriction of lower resistance to fluid flow in parallel with said first constriction;
    (h) pressure-responsive fluid gate means in series with said second constriction and operable in response to a fluid pressure differential between said isolated sources below a predetermined level to effect fluid to by-pass said first constriction.

11. A device in accordance with claim 10 wherein the pressure-responsive fluid gate means includes:
    (a) a normally open unidirectional fluid gate in series with said second constriction, and
    (b) fluid pressure-responsive means coacting between and bridging conduit means and said normally open fluid gate for actuating said fluid gate to a closed position at a predetermined fluid pressure.

12. A device in accordance with claim 11 in which the fluid pressure-responsive means (b) includes means for manually adjusting said predetermined fluid pressure.

13. A device in accordance with claim 11 which is additionally characterized by bleeder means connected with one of said first fluid conduits and coacting with said pressure-responsive fluid gate means and between said fluid gate and said fluid pressure-responsive means to prevent hydraulic lock-up.

14. A damping device including fluid flow control means for attachment to isolated sources of fluid under pressure to regulate fluid flow in either of two directions therebetween comprising in combination:
    (a) a circuit including a pair of constrictions to fluid flow connected in parallel to each other;
    (b) fluid pressure actuated by-pass means in series with one of said constrictions operable at a predetermined fluid pressure to control flow through said one constriction; and (c) fluid flow control means coacting in said circuit to provide unidirectional flow through said one of said constrictions independently of the direction of fluid movement in said isolated sources of fluid under pressure.

15. A damping device as set forth in claim 14 wherein said by-pass means includes a surface movable in response to changes in fluid pressure for controlling said by-pass means, said surface being connected to the pressure on the upstream side of said one constriction.

16. A damping device as set forth in claim 15 wherein bleed means are provided to relieve pressure on said surface.

17. A damping device including fluid flow control means for controlling the flow between two sources of fluid under pressure and regulating the fluid flow in either of two directions therebetween comprising in combination:
(a) a circuit including a pair of constrictions adapted to be connected to said sources for controlling fluid flow therebetween;
(b) fluid pressure actuated valved means operable at a predetermined fluid pressure to control flow through one of said constrictions; and
(c) said valved means including a movable surface movable in response to changes in fluid pressure for controlling said valved means, and flow control means connecting said movable surface in said circuit so that said movable surface is exposed to the pressure of the source which is at the highest pressure regardless of which source is at the highest pressure.

18. A damping device as set forth in claim 17 wherein unidirectional flow control means are provided to selectively connect said movable surface to the pressure existing in the source which is at the highest pressure.

References Cited
UNITED STATES PATENTS

| | | | |
|---|---|---|---|
| 2,475,585 | 7/1949 | Baird | 137—498 |
| 2,881,793 | 4/1959 | Lee | 137—501 |
| 3,100,504 | 8/1963 | Kauer, Jr. | 137—501X |
| 3,106,992 | 10/1963 | Sherburne | 188—87 |
| 3,113,432 | 12/1963 | Watson | 137—505.42X |
| 3,177,892 | 4/1965 | Grandstaff | 137—501 |
| 3,470,896 | 10/1969 | Werter | 137—110 |

ROBERT G. NILSON, Primary Examiner

U.S. Cl. X.R.

188—280, 299; 137—110